US012621680B2

(12) United States Patent
Jeong et al.

(10) Patent No.: US 12,621,680 B2
(45) Date of Patent: May 5, 2026

(54) COORDINATING MANAGEMENT OF A PLURALITY OF CELLS IN A CELLULAR COMMUNICATION NETWORK

(71) Applicant: Telefonaktiebolaget LM Ericsson (publ), Stockholm (SE)

(72) Inventors: Jaeseong Jeong, Solna (SE); Ezeddin Al Hakim, London (GB); Jose Outes Carnero, Torremolinos (ES); Adriano Mendo Mateo, Málaga (ES); Alexandros Nikou, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 412 days.

(21) Appl. No.: 18/285,677

(22) PCT Filed: Apr. 21, 2021

(86) PCT No.: PCT/EP2021/060378
§ 371 (c)(1),
(2) Date: Oct. 5, 2023

(87) PCT Pub. No.: WO2022/223109
PCT Pub. Date: Oct. 27, 2022

(65) Prior Publication Data
US 2024/0205698 A1 Jun. 20, 2024

(51) Int. Cl.
*H04W 24/02* (2009.01)

(52) U.S. Cl.
CPC .................................... *H04W 24/02* (2013.01)

(58) Field of Classification Search
CPC .............................. H04W 24/02; H04W 88/18
See application file for complete search history.

(56) References Cited

U.S. PATENT DOCUMENTS

| 10,375,585 B2 | 8/2019 | Tan et al. |
| 10,645,604 B2 | 5/2020 | Ouyang et al. |
| (Continued) | | |

FOREIGN PATENT DOCUMENTS

| EP | 2408227 A1 | 1/2012 |
| WO | 2007036003 A1 | 4/2007 |
| (Continued) | | |

OTHER PUBLICATIONS

International Search Report and Written Opinion for International Patent Application No. PCT/EP2021/060378, mailed Feb. 8, 2022, 12 pages.

*Primary Examiner* — Wayne H Cai
(74) *Attorney, Agent, or Firm* — Withrow & Terranova, PLLC

(57) ABSTRACT

A computer implemented method is disclosed for coordinating management of a plurality of cells in a cellular communication network, wherein each of the plurality of cells is managed by a respective Agent. The method comprises assembling a candidate set of cells, wherein each cell in the candidate set is awaiting execution of an action selected for the cell by its managing Agent. The method further comprises selecting a cell from the candidate set, adding the selected cell to an execution set of cells, and removing, from the candidate set of cells, the selected cell and all cells identified in a topology graph of the plurality of cells as fulfilling an interference condition with respect to the selected cell. The method further comprises, if a scheduling condition is fulfilled, initiating, for all cells in the execution set of cells, execution of the actions selected for the cells by their managing agents.

21 Claims, 9 Drawing Sheets

(56) References Cited

U.S. PATENT DOCUMENTS

| | | | |
|---|---|---|---|
| 2005/0054367 A1* | 3/2005 | Larsson | ............... H04W 24/00 |
| | | | 455/63.1 |
| 2016/0165472 A1 | 6/2016 | Gopalakrishnan et al. | |
| 2019/0014487 A1 | 1/2019 | Yang et al. | |
| 2019/0239238 A1 | 8/2019 | Calabrese et al. | |
| 2020/0008208 A1* | 1/2020 | Kim | ...................... H04J 11/005 |

FOREIGN PATENT DOCUMENTS

| | | | |
|---|---|---|---|
| WO | 2020259857 A1 | 12/2020 | |
| WO | 2021190772 A1 | 9/2021 | |

* cited by examiner

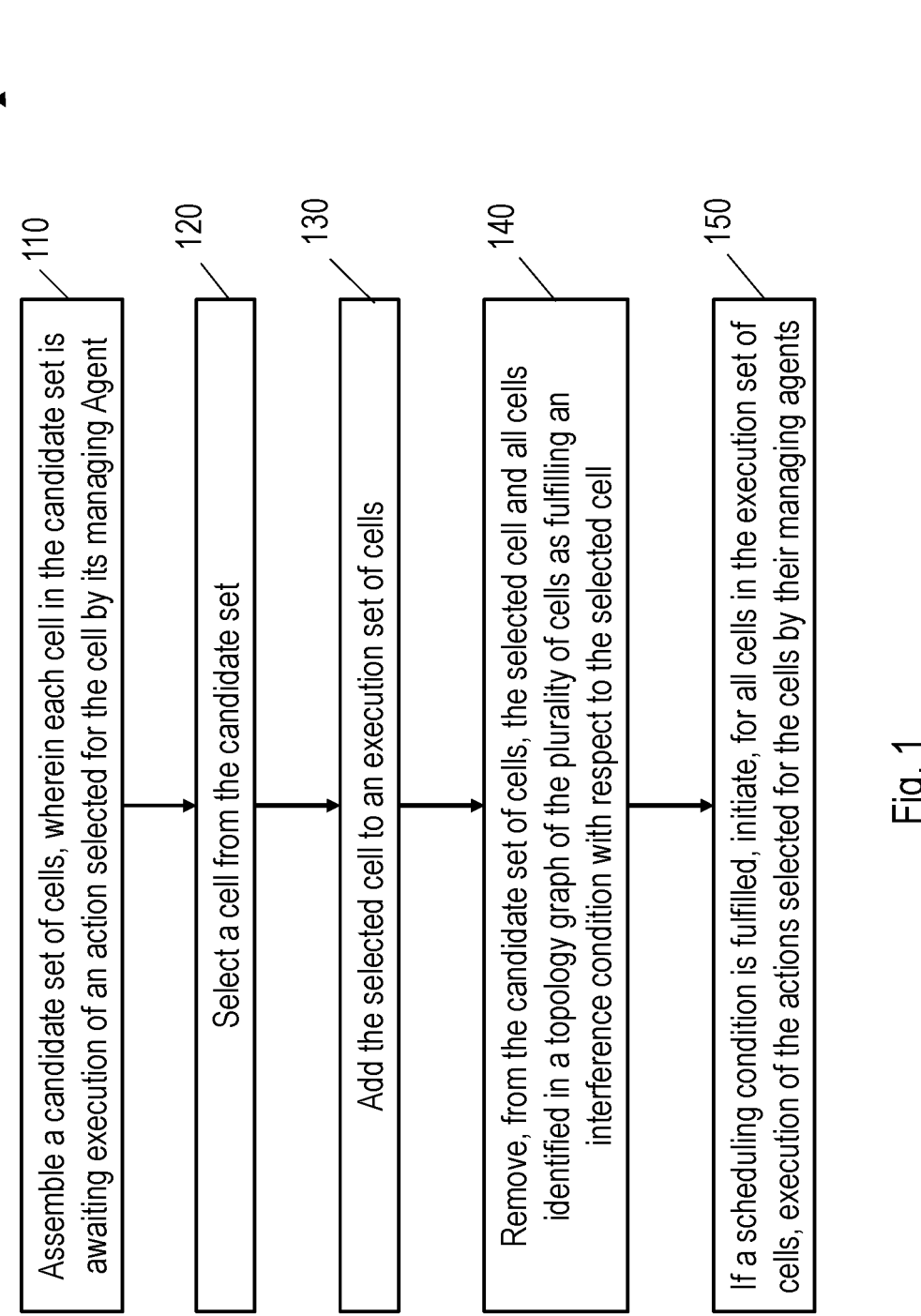

100

110 — Assemble a candidate set of cells, wherein each cell in the candidate set is awaiting execution of an action selected for the cell by its managing Agent 120 — Select a cell from the candidate set 130 — Add the selected cell to an execution set of cells 140 — Remove, from the candidate set of cells, the selected cell and all cells identified in a topology graph of the plurality of cells as fulfilling an interference condition with respect to the selected cell 150 — If a scheduling condition is fulfilled, initiate, for all cells in the execution set of cells, execution of the actions selected for the cells by their managing agents

Fig. 1

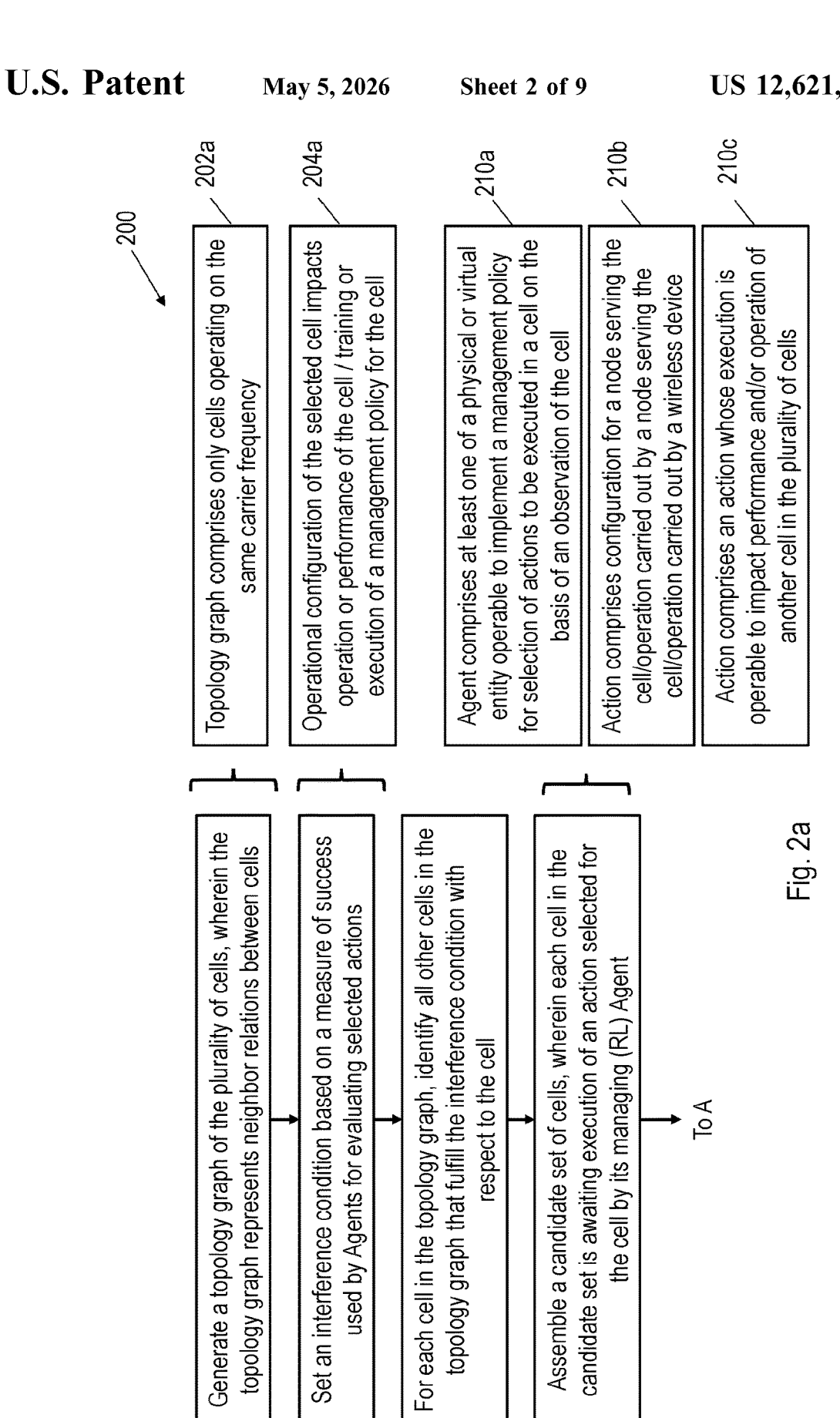

200

202 — Generate a topology graph of the plurality of cells, wherein the topology graph represents neighbor relations between cells 202a — Topology graph comprises only cells operating on the same carrier frequency 204 — Set an interference condition based on a measure of success used by Agents for evaluating selected actions 204a — Operational configuration of the selected cell impacts operation or performance of the cell / training or execution of a management policy for the cell 206 — For each cell in the topology graph, identify all other cells in the topology graph that fulfill the interference condition with respect to the cell 210 — Assemble a candidate set of cells, wherein each cell in the candidate set is awaiting execution of an action selected for the cell by its managing (RL) Agent 210a — Agent comprises at least one of a physical or virtual entity operable to implement a management policy for selection of actions to be executed in a cell on the basis of an observation of the cell 210b — Action comprises configuration for a node serving the cell/operation carried out by a node serving the cell/operation carried out by a wireless device 210c — Action comprises an action whose execution is operable to impact performance and/or operation of another cell in the plurality of cells To A

Fig. 2a

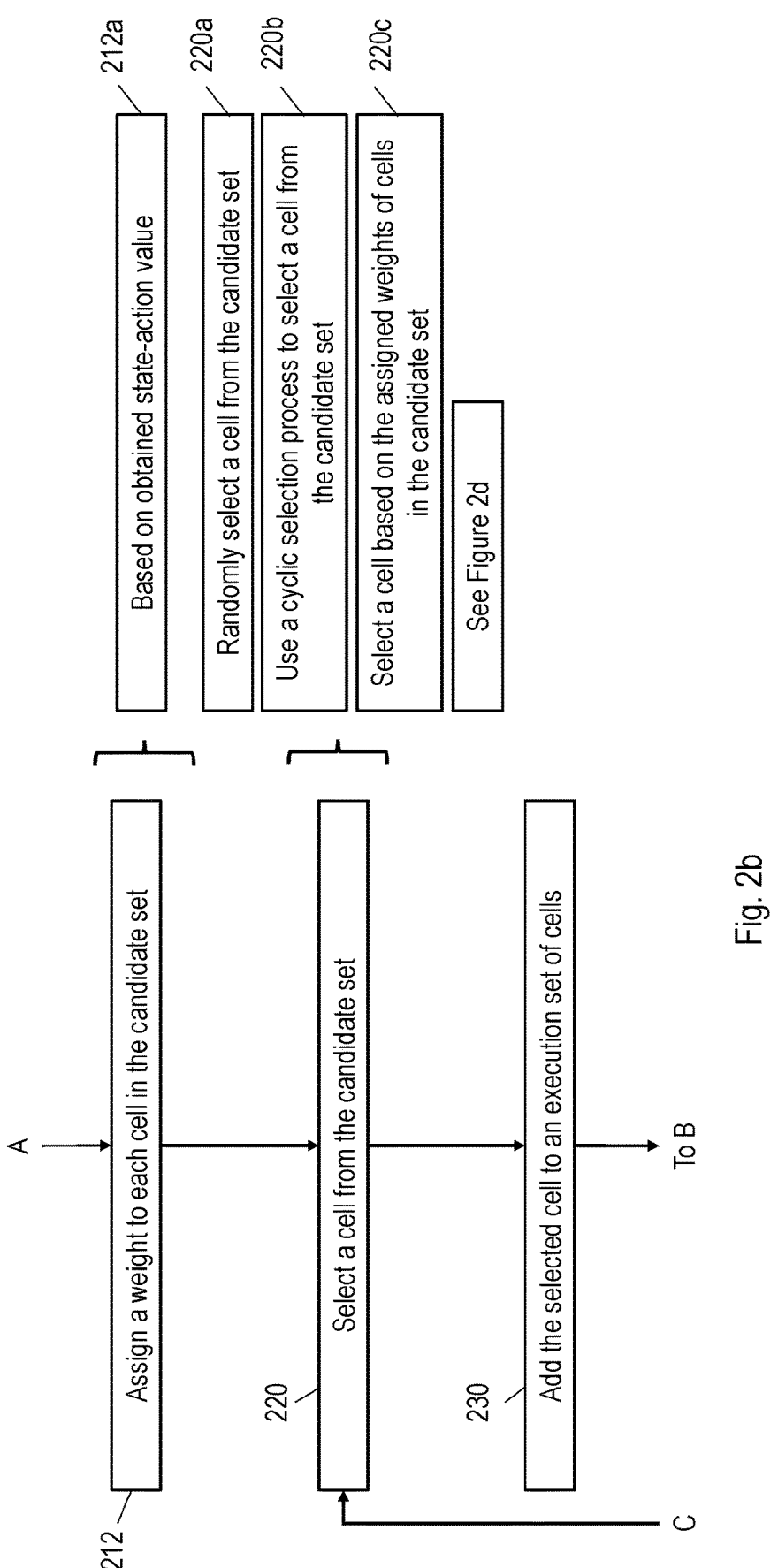

212a    Based on obtained state-action value

220a    Randomly select a cell from the candidate set

220b    Use a cyclic selection process to select a cell from the candidate set

220c    Select a cell based on the assigned weights of cells in the candidate set See Figure 2d

A

212    Assign a weight to each cell in the candidate set

220    Select a cell from the candidate set

230    Add the selected cell to an execution set of cells

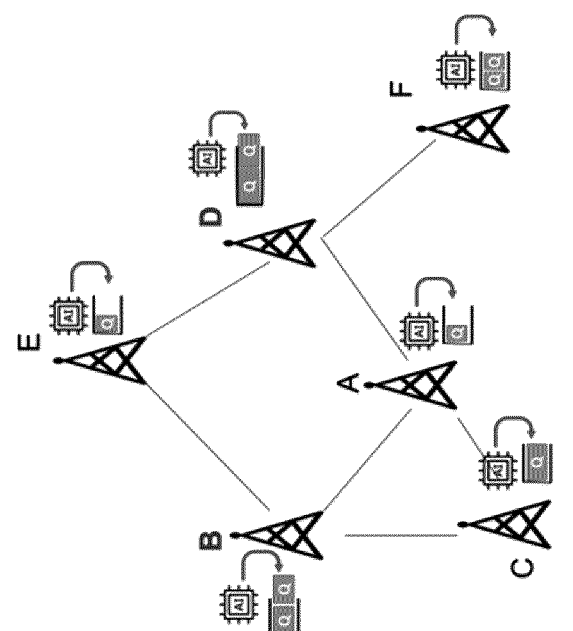
Fig. 7

COORDINATING MANAGEMENT OF A PLURALITY OF CELLS IN A CELLULAR COMMUNICATION NETWORK

This application is a 35 U.S.C. § 371 national phase filing of International Application No. PCT/EP2021/060378, filed Apr. 21, 2021, the disclosure of which is incorporated herein by reference in its entirety.

TECHNICAL FIELD

The present disclosure relates to a computer implemented method for coordinating management of a plurality of cells in a cellular communication network, each of the plurality of cells being managed by a respective Agent. The method is performed by a controller node, and the present disclosure also relates to a controller node and to a computer program product configured, when run on a computer, to carry out a method for coordinating management of a plurality of cells in a cellular communication network.

BACKGROUND

Cellular communication networks are complex systems in which each cell of the network has its own set of configurable parameters. Some of these parameters only impact the performance of the cell to which they are applied. Improving the performance of an individual cell by changing a value of a parameter that only impacts that cell will always translate into an improvement in the global performance of the network, and it is consequently relatively straightforward to determine an optimum value for such parameters. A significant number of configurable cell parameters do not fall into this category however, and a change in value of these parameters not only impacts the performance of the cell to which they are applied, but also the performance of neighboring cells. For such parameters, improving the performance of a cell via adjusting parameter value may result in degrading performance in surrounding cells, and could lead to degrading the global performance of the network. Determining an optimum value for this kind of parameter is one of the most challenging tasks when optimizing cellular networks.

Examples of parameters that can impact performance of neighboring cells include:

Remote Electrical Tilt (RET): defines the antenna tilt of the cell, and can be adjusted remotely to improve the Downlink (DL) Signal to Interference plus Noise Ratio (SINR) in the cell concerned. Such adjustments can however degrade the SINR of surrounding cells.

P0 Nominal Physical Uplink Shared Channel (PUSCH): defines the target power per resource block (RB) which the cell expects in the Uplink (UL) communication, from the User Equipment (UE) to the Base Station (BS). Increasing P0 Nominal PUSCH can increase the UL SINR in the cell under modification (thanks to signal increase) but may also decrease the UL SINR in the surrounding cells (owing to increased interference).

The above examples illustrate a tradeoff between performance of a cell under modification and performance of its surrounding cells. Improving the overall performance of a cellular communication network implies managing this tradeoff to optimize global performance measures. The tradeoff between target and surrounding cell performance is difficult to estimate and varies on a case by case basis; the problem of optimizing global network performance by modifying parameters on a per-cell basis is considered as NP-hard in computational complexity theory.

Artificial Intelligence (AI) is expected to play an important role in network parameter optimization in cellular networks. One promising AI technology is Reinforcement Learning (RL), in which agents learn a management policy from past experiences with the aim of optimizing a certain reward. During the learning, each agent 1) explores possible actions, 2) observes consequences of the explored actions including next state entered by the controlled system and a defined reward signal, and then 3) updates its policy with the aim of maximizing future reward. RL techniques have been explored for use in optimizing cell antenna tilt, with agents taking actions comprising increasing, decreasing, or maintaining a current downtilt of a cell antenna with the aim of optimizing some combination of performance measures, including for example cell capacity and cell coverage.

When seeking to optimize parameters of communication network cells, it is typical to allocate a local agent to each cell, with each local agent responsible for optimizing a single local parameter (e.g., antenna tilt). In this scenario, local RL agents execute actions independently, either seeking to explore the state-action space of the cell or to exploit existing knowledge of the cell. However, this typical practice does not explicitly consider the impact of actions of each cell on Key Performance Indicators (KPIs) of its neighboring cells, including for example wireless interference.

One significant problem associated with independent agent cell parameter management is the possibility of unintentionally creating an undesirable network situation, such as for example a coverage hole between two cells. Another important problem is noisy feedback for RL training. For stable training of an RL agent, the feedback observation (including reward and next state) should be a consequence only of the action made by the local agent. However, when considering parameters that may impact multiple cells, the feedback observation that is used to train an agent in a cell is not only a consequence of its own action but also of actions of other agents in neighboring cells. The impact of the actions of neighboring cells on the feedback for any given RL agent will be a significant source of noise in the feedback signal, degrading training stability for the agent.

Multi-agent RL is an option that is being explored for addressing the above issues. However, considerable additional research will be needed before the practical implementation of multi-agent RL in large scale networks becomes feasible.

SUMMARY

It is an aim of the present disclosure to provide a method, a controller node, and a computer program product which at least partially address one or more of the challenges discussed above. It is a further aim of the present disclosure to provide a method, a controller node and a computer program product that cooperate to ensure coordination between actions executed in different cells of a communication network, so as to enable optimization of global network parameters and to ensure a stable training signal for individual agents.

According to a first aspect of the present disclosure, there is provided a computer implemented method for coordinating management of a plurality of cells in a cellular communication network, wherein each of the plurality of cells is managed by a respective Agent. The method, performed by a controller node, comprises assembling a candidate set of cells, wherein each cell in the candidate set is awaiting execution of an action selected for the cell by its managing Agent. The method further comprises selecting a cell from the candidate set, adding the selected cell to an execution set of cells, and removing, from the candidate set of cells, the selected cell and all cells identified in a topology graph of the plurality of cells as fulfilling an interference condition with respect to the selected cell. The method further comprises, if a scheduling condition is fulfilled, initiating, for all cells in the execution set of cells, execution of the actions selected for the cells by their managing agents.

According to another aspect of the present disclosure, there is provided a computer program product comprising a computer readable medium, the computer readable medium having computer readable code embodied therein, the computer readable code being configured such that, on execution by a suitable computer or processor, the computer or processor is caused to perform a method according to any one or more of the aspects or examples of the present disclosure.

According to another aspect of the present disclosure, there is provided a controller node for coordinating management of a plurality of cells in a cellular communication network, wherein each of the plurality of cells is managed by a respective Agent. The controller node comprises processing circuitry configured to cause the controller node to assemble a candidate set of cells, wherein each cell in the candidate set is awaiting execution of an action selected for the cell by its managing Agent. The processing circuitry is further configured to cause the controller node to select a cell from the candidate set, add the selected cell to an execution set of cells, and remove, from the candidate set of cells, the selected cell and all cells identified in a topology graph of the plurality of cells as fulfilling an interference condition with respect to the selected cell. The processing circuitry is further configured to cause the controller node, if a scheduling condition is fulfilled, to initiate, for all cells in the execution set of cells, execution of the actions selected for the cells by their managing agents.

According to another aspect of the present disclosure, there is provided a controller node for coordinating management of a plurality of cells in a cellular communication network, wherein each of the plurality of cells is managed by a respective Agent. The controller node comprises a candidate module for assembling a candidate set of cells, wherein each cell in the candidate set is awaiting execution of an action selected for the cell by its managing Agent. The controller node further comprises a selection module for selecting a cell from the candidate set, adding the selected cell to an execution set of cells, and removing, from the candidate set of cells, the selected cell and all cells identified in a topology graph of the plurality of cells as fulfilling an interference condition with respect to the selected cell. The controller node further comprises an initiating module for, if a scheduling condition is fulfilled, initiating, for all cells in the execution set of cells, execution of the actions selected for the cells by their managing agents.

Aspects of the present disclosure thus provide a method and nodes that facilitate centralised coordination of execution of actions selected by local management agents for a plurality of cells in a communication network. The centralised coordination is implemented via a scheduling of execution of locally selected actions, which scheduling takes account of the topology of the plurality of cells. Methods presented herein use an interference criterion to identify cells for which an action executed in one cell can impact performance of neighbouring cells, and to ensure that selected action are not executed simultaneously in such cells. The nature of the interference criterion can be targeted to the particular actions being scheduled, and their likely or known impact upon surrounding cells. In this manner, methods and nodes presented herein can reduce noise in the observation signals of individual agents, ensuring that the observations (next state and reward) of individual agents are a direct consequence of the action selected by the agent, as opposed to incorporating the consequences of actions executed in neighbouring cells. Some examples of the present disclosure may additionally ensure a balance between exploration of state-action space and exploitation of existing knowledge by individual agents, for example by providing a guarantee of a certain level of exploration within the plurality of cells.

BRIEF DESCRIPTION OF THE DRAWINGS

For a better understanding of the present disclosure, and to show more clearly how it may be carried into effect, reference will now be made, by way of example, to the following drawings in which:

FIG. 1 is a flow chart illustrating process steps in a computer implemented method for coordinating management of a plurality of cells in a cellular communication network;

FIGS. 2a to 2d show a flow chart illustrating process steps in another example of computer implemented method for coordinating management of a plurality of cells in a cellular communication network;

FIG. 7 illustrates application of the method of FIG. 1 to a plurality of cells.

DETAILED DESCRIPTION

Figure 2C:
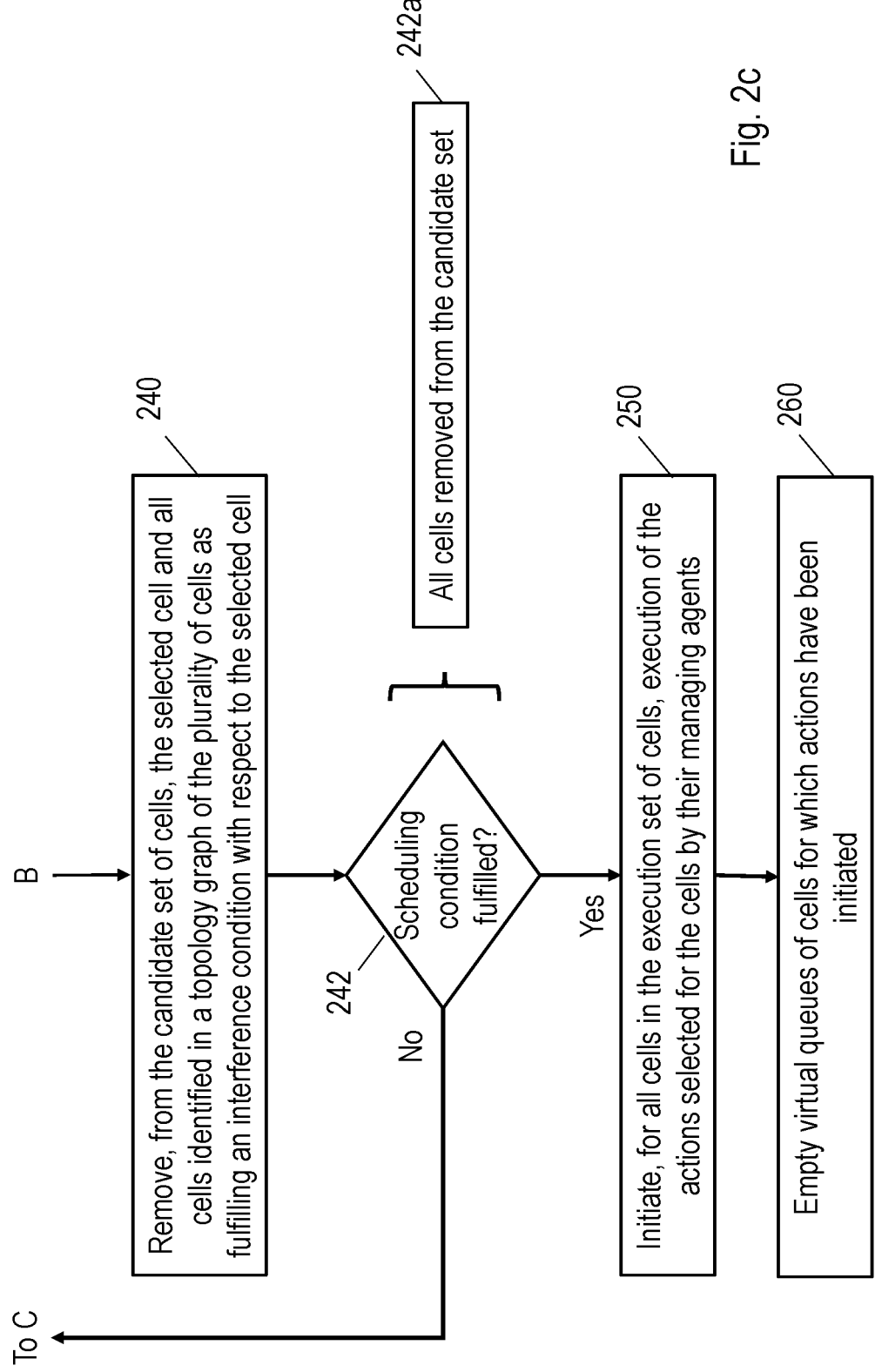

As discussed above, examples of the present disclosure provide methods and nodes that facilitate coordination of execution of actions selected by agents managing individual cells in a communication network. This coordination can reduce noise in the training of individual agents and implementation of their policies, so resulting in improved policy generation and implementation for management of individual cells, and consequently in an improvement in overall network management.

FIG. 1 is a flow chart illustrating process steps in a computer implemented method for coordinating management of a plurality of cells in a cellular communication network, wherein each of the plurality of cells is managed by a respective Agent. For the purpose of the present disclosure, an Agent comprises a physical or virtual entity that is operable to implement a policy for the selection of actions on the basis of an environment state. Examples of a physical entity may include a computer system, computing device, server etc. Examples of a virtual entity may include a piece of software or computer program, a code fragment operable to implement a computer program, a virtualised function, or any other logical entity. A virtual entity may for example be instantiated in a cloud, edge cloud or fog deployment. As discussed in further detail below, an Agent may be operable to implement a management policy for the selection of actions to be executed in a cell on the basis of an observation of the cell, and to use feedback for training in an online environment, in order to continually update its management policy and improve the quality of actions selected. An Agent may for example be operable to implement an RL model for selecting actions to be executed on an environment. Examples of RL models may include Q-learning, State-Action-Reward-State-Action (SARSA), Deep Q Network, Policy Gradient, Actor-Critic, Asynchronous Advantage Actor-Critic (A3C), etc.

The method 100 is performed by a controller node, which may comprise a physical or virtual node, and may be implemented in a computing device or server apparatus and/or in a virtualized environment, for example in a cloud, edge cloud or fog deployment. The controller node may for example be implemented in a core network of the communication network. The controller node may be implemented in the Operation Support System (OSS). Also, in the developing Open Radio Access Network (O-RAN) architecture, the controller node could be embedded as an rApp in the Service Management and Orchestration (SMO) framework. The controller node may encompass multiple logical entities, as discussed in greater detail below, and may for example comprise a Virtualised Network Function (VNF).

Referring to FIG. 1, the method 100 comprises, in a first step 110, assembling a candidate set of cells, wherein each cell in the candidate set is awaiting execution of an action selected for the cell by its managing Agent. The nature of the action may vary depending upon the particular use case for which the method is implemented. For example if the Agent is for managing the RET of a cell, the action may be an adjustment of antenna downtilt angle (increase angle, decrease angle, maintain current angle). If the Agent is managing P0 Nominal PUSCH, the action may be a change in the requested value of the P0 Nominal PUSCH.

In step 120, the method 100 comprises selecting a cell from the candidate set, and in step 130, the method 100 comprises adding the selected cell to an execution set of cells. In step 140, the method comprises removing, from the candidate set of cells, the selected cell and all cells identified in a topology graph of the plurality of cells as fulfilling an interference condition with respect to the selected cell. For the purpose of the present disclosure, a topology graph comprises a graphical representation of the plurality of cells, each node of the topology graph representing an individual cell and edges between the nodes of the topology graph representing neighbor relations between individual cells of the plurality of cells.

It will be appreciated that the interference condition with respect to the selected cell may not relate specifically to wireless interference. Rather, the interference condition comprises a condition setting out the extent to which the operation and/or operational configuration of any one cell may impact performance of, or interfere with, the operation of another cell, and may consequently interfere with the training and execution of a management policy in the other cell. This interference in training or execution of a management policy may for example result from causing noise in cell observations, causing coverage holes between cells, etc. Cells that fulfil an interference condition with respect to one another may therefore be envisaged as being functionally and/or operationally coupled, such that the functioning and/or operational configuration of one cell is operable to impact in some manner the functioning or operation of the other cell. The cells concerned may be geographically close, and for example may be neighbor cells, with adjacent coverage areas, or may be second or third hop neighbors, that is neighbors of neighbors.

Referring still to FIG. 1, in step 150, if a scheduling condition is fulfilled, the method 100 comprises initiating, for all cells in the execution set of cells, execution of the actions selected for the cells by their managing agents.

In contrast to known methods for addressing the challenges of using AI to manage cell parameters that may impact other cells, which methods generally seek to incorporate coordination between cells into the policy for selecting cell actions, the method 100 does not complicate the management process of any individual cell. The method 100 schedules execution of actions selected for cells so as to ensure that actions are not executed in interfering cells at the same time. In this manner, unforeseen outcomes such as coverage holes are avoided, and it may be ensured that the reward signal received by the individual Agents is uncontaminated by actions at interfering cells, ensuring improved training stability and consequently improved cell management. It will be appreciated that the method 100 may consequently coordinate management of the plurality of cells in the cellular communication network such that performance of the plurality of cells is optimized with respect to at least one network level performance parameter.

FIGS. 2a to 2d show flow charts illustrating process steps in a further example of method 200 for coordinating management of a plurality of cells in a cellular communication network, wherein each of the plurality of cells is managed by a respective Agent. The method 200 provides various examples of how the steps of the method 100 may be implemented and supplemented to achieve the above discussed and additional functionality. As for the method 100, the method 200 is performed by a controller node, which may be a physical or virtual node, and which may encompass multiple logical entities.

Referring to FIG. 2a, in a first step 202 of the method 200, the controller node generates a topology graph of the plurality of cells whose management is to be coordinated, wherein the topology graph represents neighbor relations between cells. As illustrated at 202a, the topology graph may comprise only cells operating on the same carrier frequency. This may reflect the much smaller impact that two cells on different carrier frequencies may have on each other's performance. As discussed above, cells may be connected by an edge in the topology graph if they are neighbors, with neighbor relation determined for example by geographic location and carrier frequency, such that cells whose coverage areas overlap or share a boundary, and which are operating on the same carrier frequency, being considered to be neighbors.

In step 204, the controller node sets the interference condition to be used later in the method, based on a measure of success used by Agents for evaluating selected actions. In the case of Agents implementing RL policies, the measure of success may for example be the reward function for RL Agents. For example, a reward function may explicitly or implicitly (for example via the next state of the cell being managed) take account of KPIs in next hop neighbors, and/or second, third or additional hop neighbors. The interference condition may consequently be an N-hop neighbor condition, where N is selected on the basis of the number of neighbor cells whose KPIs form part of the state and/or reward for a given cell.

As illustrated at 204a, a cell may fulfill an interference condition with respect to the selected cell if at least one of performance or operation of the cell can be impacted by an operational configuration of the selected cell and/or if at least one at least one of training or execution of a management policy for the cell can be impacted by an operational configuration of the selected cell. It will be appreciated that in the present context, "impact" may refer to a change in the impacted cell of a value of one or more configurable parameters (operation impact) or an observed value of one or more performance parameters (performance impact) which change is above a threshold value. A change in a value of a configurable parameter refers to a change which may be implemented in order to compensate for effects of actions taken in the selected cell. For example, a change in the P0 nominal PUSCH of the impacted cell, which change is required to compensate for reduced SINR in the cell caused by an action taken in the selected cell.

In step 206, the controller node identifies, for each cell in the topology graph, all other cells in the topology graph that fulfill the interference condition with respect to the cell. The controller node then, in step 210, assembles a candidate set of cells, wherein each cell in the candidate set is awaiting execution of an action selected for the cell by its managing Agent. As discussed above and illustrated at step 210a, an Agent may comprise at least one of a physical or virtual entity that is operable to implement a management policy for the selection of actions to be executed in a cell on the basis of an observation of the cell. Agents may consequently operate on the basis of feedback from a managed environment, with RL Agents being one example. Cell observations may for example include any measured parameter such as a KPI of the cell and/or of neighboring cells.

As illustrated at 210b, an action selected for a cell by its managing Agent comprises at least one of:

a configuration for a communication network node serving the cell, a configuration for a communication network operation carried out by a communication network node serving the cell, and/or a configuration for an operation performed by a wireless device in relation to a communication network node serving the cell.

An action selected for a cell by its managing Agent may in some examples comprise an action whose execution is operable to impact at least one of performance or operation of another cell in the plurality of cells, as illustrated at 210c and discussed in greater detail above with respect to the interference condition. It will be appreciated that executing an action may not always imply making a change in a configuration, as "no change" may be a valid action available for selection by an agent. For example, in the case of Remote Electrical Tilt, an antenna downtilt angle may be increased, decreased, or may be maintained at its current value, if the agent implementing the relevant management policy determines that, in view of the current state of the cell, maintaining the current downtilt angle will result in the greatest future expected reward. Executing a "no change" action in a selected cell may mean that the impact on performance or operation of another cell also does not change, but the impact is still present. For example if a configurable parameter in the impacted cell was changed to compensate for effects of the antenna downtilt angle being changed to its current value, then maintaining the current antenna downtilt angle implies maintaining the change in the configurable parameter of the impacted cell, which change would not be necessary if the selected cell was not operating with the current antenna tilt angle.

Referring now to FIG. 2b, in step 212, the controller node assigns a weight to each cell in the candidate set. The weight assigned to any given cell may be based on any suitable measure of the importance or priority to be allocated to executing the action that has been selected for the cell. For example and as illustrated at 212a, if the Agents managing the cells are RL Agents, assigning a weight to each cell in the candidate set may comprise, for a cell, first obtaining a current state-action value from the RL Agent managing the cell. This may for example comprise a Q value calculated by the Agent. The controller node may then set as the weight of the cell at least one of the obtained state-action value (Q value) and/or an aggregate of all obtained state-action values (Q values) in a virtual queue assigned to the cell, wherein the virtual queue contains state-action values for each time step of the RL Agent since an action was last executed in the cell. The aggregate may for example be a sum of the values in the virtual queue. The sum of state-action values in the virtual queue provides an indirect representation of virtual queue length, weighted by state-action values (Q values), which indicates to what extent each Agent has had the opportunity to execute its actions in the past.

In step 220, the controller node selects a cell from the candidate set. Selecting a cell may be performed according to a range of different criteria. For example, the controller node may randomly select a cell from the candidate set as illustrated at 220a, or may use a cyclic selection process, such as a Round Robin algorithm, to select a cell from the candidate set as illustrated at 220b. In another example, the controller node may select a cell based on the assigned weights of cells in the candidate set, as illustrated at 220c. For example, the controller node may select the cell having the highest assigned weight.

Figure 2D:
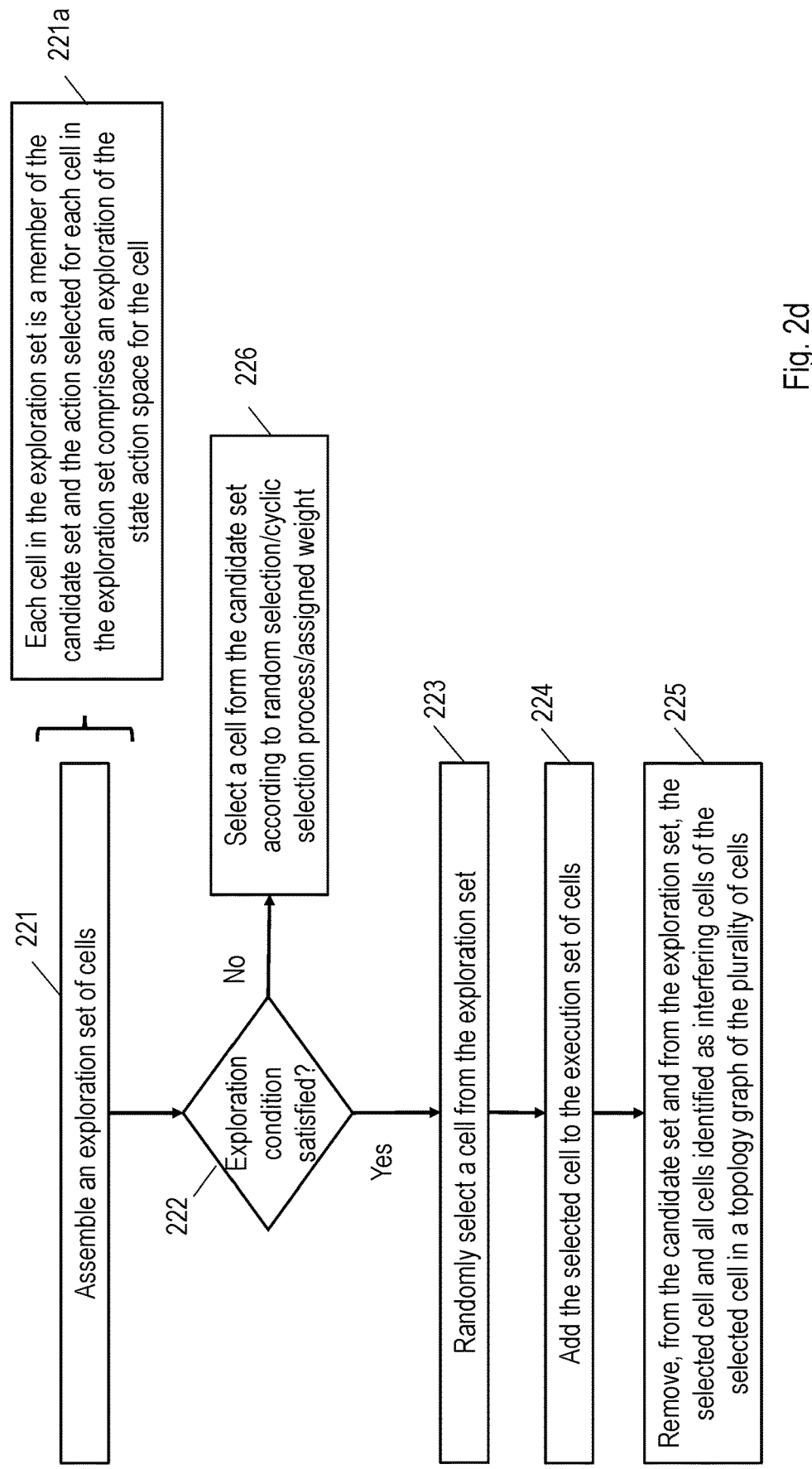

FIG. 2d illustrates in greater detail steps that may be carried out in order to select a cell at step 220 according to one example implementation of this step. The process for step 220 illustrated in FIG. 2d implements a degree of guaranteed exploration of state action spaces for cells of the managed plurality of cells.

Referring now to FIG. 2d, in the illustrated implementation of step 220, the controller node first assembles an exploration set of cells. As illustrated at 221a, each cell in the exploration set is a member of the candidate set, and the action selected for each cell in the exploration set comprises an exploration of the state-action space for the cell. For example, individual Agents may set an exploration flag according to whether they are in an exploration phase or an exploitation phase for any given selected action. Assembling the exploration set at step 221 may therefore comprise populating the set with all cells from the candidate set for which an exploration flag is set to true. The controller node then checks at step 222 whether or not an exploration condition is satisfied. The exploration condition may be set to control how much guaranteed exploration should be performed. For example, the exploration condition may require that the exploration set comprises at least one cell, and that the percentage of the plurality of cells that have been added to the execution set is below a threshold value. The threshold value may thus place a limit on the amount of guaranteed exploration, with a threshold of zero for no guaranteed exploration, and an increasing threshold value providing increasing prioritisation of guaranteed exploration. The method 200 may further comprise setting this threshold value in accordance with operator priorities etc.

While the exploration condition is satisfied (Yes at step 222), the controller node randomly selects a cell from the exploration set in step 223, adds the selected cell to the execution set of cells in step 224, and removes, from the candidate set and from the exploration set, the selected cell and all cells identified in the topology graph of the plurality of cells as fulfilling an interference condition with respect to the selected cell. The random selection from the exploration set in step 223 may be considered to be consistent with an exploration phase, in which different actions are explored to determine their impact on a system.

Once the exploration condition is no longer satisfied (No at step 222), for example because the exploration set is empty, or the percentage of the plurality of cells that have been added to the execution set has reached or exceeded a threshold value, the controller node then selects a cell from the candidate set at step 226. This selection may be according to at least one of random selection, a cyclic selection process and/or a weight assigned to each cell in the candidate set, as discussed in greater detail above.

Referring again to FIG. 2*b*, after selecting a cell from the candidate set in step 220, the controller node adds the selected cell to the execution set of cells in step 230. As discussed above, the execution set of cells contains cells whose actions are to be executed the next time a scheduling condition is fulfilled.

Referring now to FIG. 2*c*, in step 240, the controller node removes, from the candidate set of cells, the selected cell and all cells identified in the topology graph of the plurality of cells as fulfilling the interference condition with respect to the selected cell.

In step 242, the controller node checks whether or not a scheduling condition is fulfilled. In one example, as illustrated at 242*a*, the scheduling condition may comprise all cells having been removed from the candidate set. If the scheduling condition is not fulfilled (No at step 242), the controller node returns to step 220 and selects another cell from the candidate set. If the scheduling condition is fulfilled (Yes at step 242), the controller node initiates, for all cells in the execution set of cells, execution of the actions selected for the cells by their managing agents at step 250. This may for example comprise sending a message to the Agents managing the cells in the execution set, instructing the Agents to proceed with executing their selected actions. The Agents may then proceed to cause the selected actions to be executed according to the functioning of the cell concerned.

In step 260, if weights have been assigned by the controller node to the cells in the candidate set, and if the weight of each cell comprises the sum of obtained state-action values in a virtual queue assigned to the cell, then following initiation of actions selected for cells in the execution set of cells by their managing agents, the controller node empties the virtual queues of the cells for which actions have been initiated. In this manner, the sum of the values in the virtual queues will continue to provide a representation, weighted by the state-action values in the queues, of how long it has been since each cell had the opportunity to execute an action.

As discussed above, the methods 100, and 200 may be performed by a controller node, and the present disclosure provides a controller node that is adapted to perform any or all of the steps of the above discussed methods. The controller node may be a physical or virtual node, and may for example comprise a virtualised function that is running in a cloud, edge cloud or fog deployment. The controller node may for example comprise or be instantiated in any part of a logical core network node, network management centre, network operations centre, Radio Access node etc. Any such communication network node may itself be divided between several logical and/or physical functions, and any one or more parts of the management node may be instantiated in one or more logical or physical functions of a communication network node.

Figure 3:
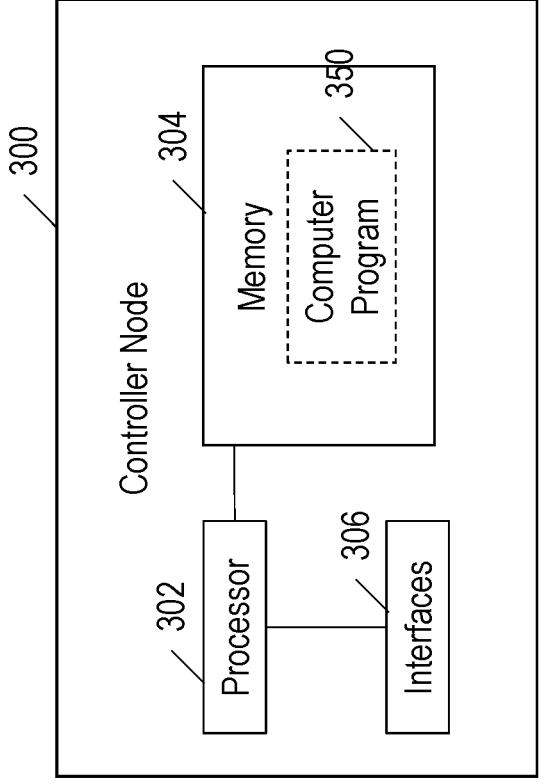
FIG. 3 is a block diagram illustrating functional modules in a controller node.

FIG. 3 is a block diagram illustrating an example controller node 300 which may implement the method 100, and/or 200, as illustrated in FIGS. 1, and 2*a* to 2*d*, according to examples of the present disclosure, for example on receipt of suitable instructions from a computer program 350. Referring to FIG. 3, the controller node 300 comprises a processor or processing circuitry 302, and may comprise a memory 304 and interfaces 306. The processing circuitry 302 is operable to perform some or all of the steps of the method 100 and/or 200 as discussed above with reference to FIGS. 1 and 2*a* to 2*d*. The memory 304 may contain instructions executable by the processing circuitry 302 such that the controller node 300 is operable to perform some or all of the steps of the method 100 and/or 200, as illustrated in FIGS. 1 and 2*a* to 2*d*. The instructions may also include instructions for executing one or more telecommunications and/or data communications protocols. The instructions may be stored in the form of the computer program 350. In some examples, the processor or processing circuitry 302 may include one or more microprocessors or microcontrollers, as well as other digital hardware, which may include digital signal processors (DSPs), special-purpose digital logic, etc. The processor or processing circuitry 302 may be implemented by any type of integrated circuit, such as an Application Specific Integrated Circuit (ASIC), Field Programmable Gate Array (FPGA) etc. The memory 304 may include one or several types of memory suitable for the processor, such as read-only memory (ROM), random-access memory, cache memory, flash memory devices, optical storage devices, solid state disk, hard disk drive etc. The controller node may further comprise interfaces 306 which may be operable to facilitate communication with other controller nodes, with Agents managing individual cells, and/or with any other communication network nodes over suitable communication channels.

Figure 4:
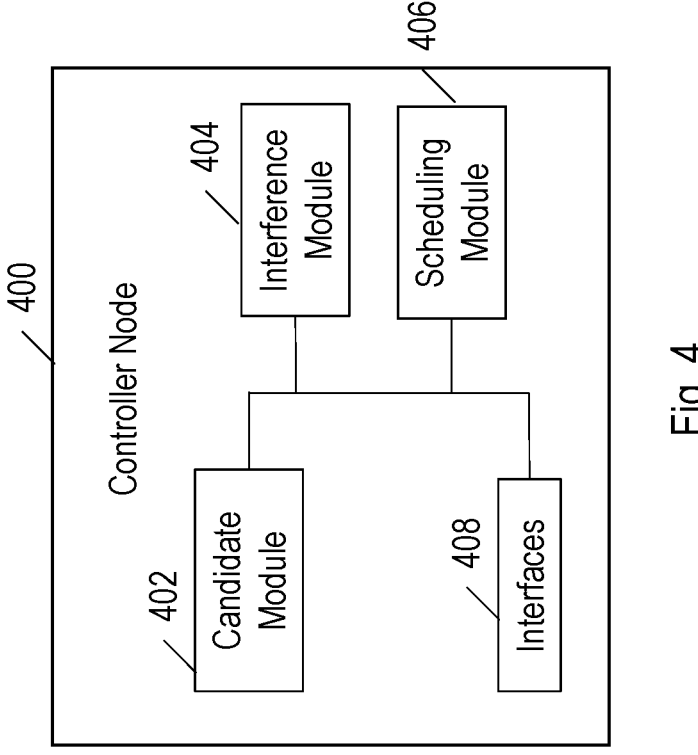
FIG. 4 is a block diagram illustrating functional modules in another example of controller node.

FIG. 4 illustrates functional modules in another example of controller node 400 which may execute examples of the methods 100 and/or 200 of the present disclosure, for example according to computer readable instructions received from a computer program. It will be understood that the modules illustrated in FIG. 4 are functional modules, and may be realised in any appropriate combination of hardware and/or software. The modules may comprise one or more processors and may be integrated to any degree.

Referring to FIG. 4, the controller node 400 is for coordinating management of a plurality of cells in a cellular communication network, wherein each of the plurality of cells is managed by a respective Agent. The controller node comprises a candidate module 402 for assembling a candidate set of cells, wherein each cell in the candidate set is awaiting execution of an action selected for the cell by its managing Agent. The controller node further comprises a selection module 404 for selecting a cell from the candidate set, adding the selected cell to an execution set of cells, and removing, from the candidate set of cells, the selected cell and all cells identified in a topology graph of the plurality of cells as fulfilling an interference condition with respect to the selected cell. The controller node further comprises an initiating module 406 for, if a scheduling condition is fulfilled, initiating, for all cells in the execution set of cells, execution of the actions selected for the cells by their managing agents. The controller node may further comprise interfaces 408 which may be operable to facilitate communication with other controller nodes, with Agents managing individual cells, and/or with any other communication network nodes over suitable communication channels.

FIGS. 1 to 2*d* discussed above provide an overview of methods which may be performed according to different examples of the present disclosure, and which may be executed by a controller node 300, 400. The methods involve scheduling of execution of actions selected by managing Agents so as to ensure that actions for cells identified as fulfilling an interference criterion with respect to one another are not executed at the same time. In this manner, the methods facilitate global optimization of performance of a plurality of cells, as well as ensuring training and execution stability for the Agents learning and executing management policies for the individual cells. There now follows a detailed discussion of elements of the above methods, and of how different process steps illustrated in FIGS. 1 to 2d and discussed above may be implemented according to an example process flow.

Topology Graph (Steps 140, 202, 206, 240)

It will be appreciated that multiple topology graphs may be maintained by one or more controller nodes, for example including one topology graph per carrier frequency in a communication network, as actions on different carrier frequencies do not impact neighbor cell performance. A topology graph, including the neighbor relations between cells, can be generated in a range of different ways including by using existing relations in the network Configuration Management (CM), by calculating the distance and directionality between a pair of cells, using the X2 link topology, using an interference matrix from Cell Traces, Cell Traffic Recording (CTR), etc. It will be appreciated that each graph is independent, and consequently while a cell operating on more than one carrier frequency may appear in more than one graph, each appearance of the cell is specific to a particular graph and carrier frequency.

Interference Condition (Steps 140, 204, 206, 240)

It will be appreciated that the controller node prevents cells that are functionally or operationally coupled from changing their configurable parameters (through execution of selected actions) at the same time. As discussed above, operationally coupled cells are defined according to an interference criterion, which may in some examples comprise an N-hop neighbor criterion, with all cells that are connected by an edge to a selected cell in the topology graph being neighbors of the selected cell. The value of N can be selected according for example to the way reward is calculated by one or more of the Agents, what observations are taken into account by the Agents, what observations contribute to a cell state, etc. A 1-hop interference condition is fulfilled by all neighboring cells of a selected cell in the topology graph. A 2-hop interference condition is fulfilled by all neighbors of neighboring cells of a selected cell in the topology graph.

Cell Selection, Removing Interfering Cells and Initiating Execution (Steps 120-150, 220-250)

Figure 5:
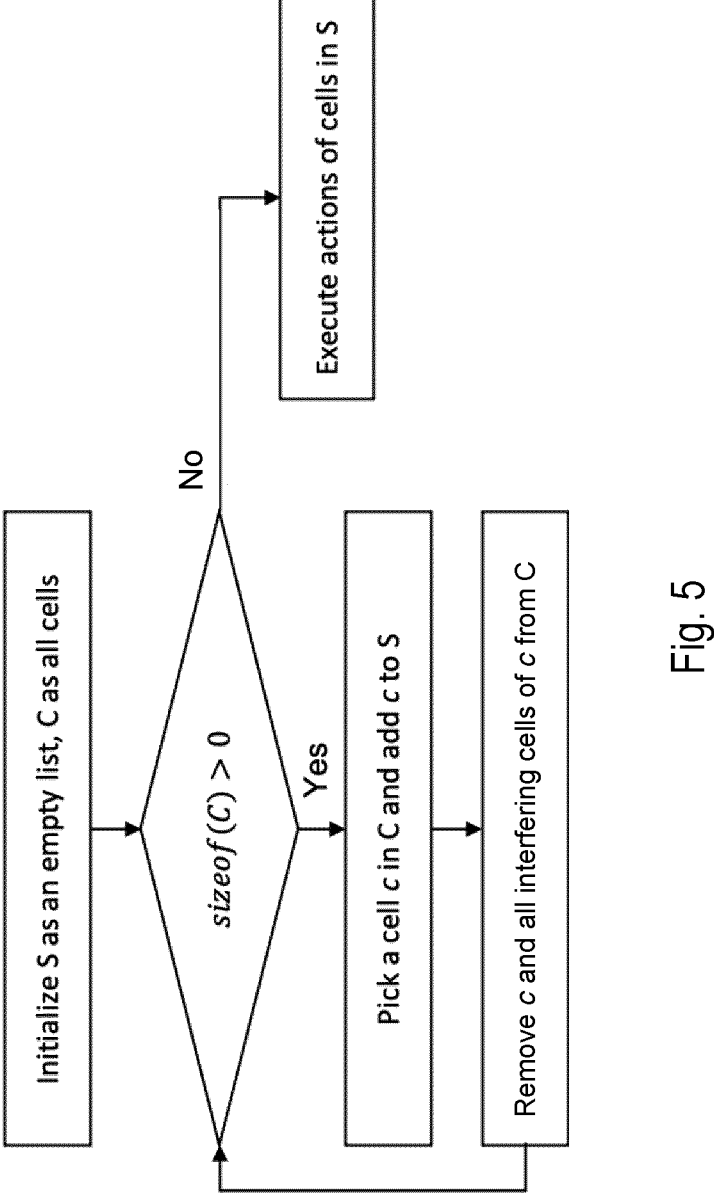
FIG. 5 is a flow chart illustrating an example implementation of the method of FIG. 1.
Figure 6:
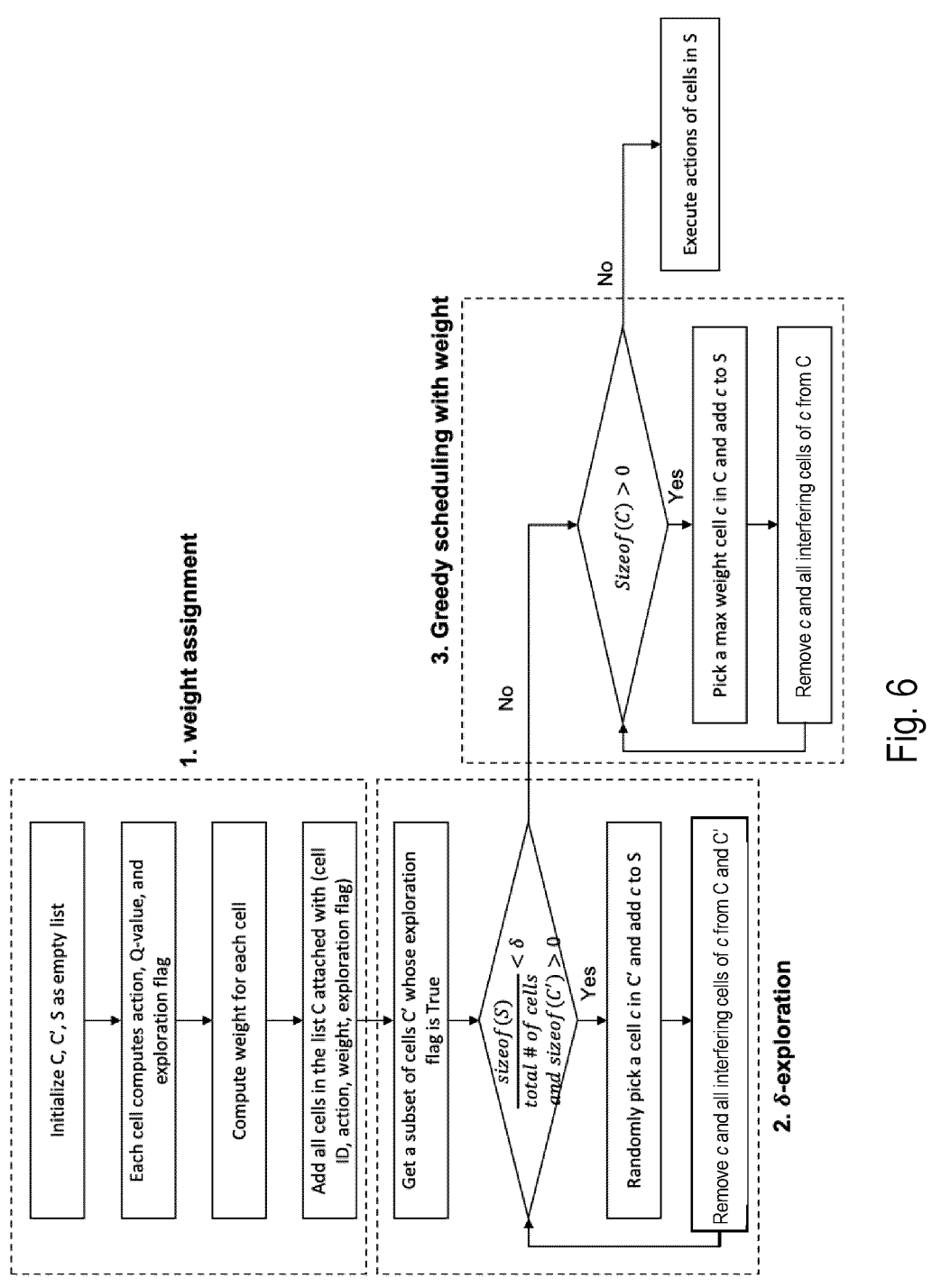
FIG. 6 is a flow chart illustrating another example implementation of the method of FIG. 1.

As discussed above, the controller node aims to ensure that action executions for cells within a topology graph are scheduled in accordance with a constraint that cells operable to impact each other's performance or operation do not change their parameters at the same time. FIGS. 5 and 6 illustrate two alternative process flows implementing different examples of the methods 100, 200.

Cell Selection without Guaranteed Exploration (Steps 120, 220a, 220b)

FIG. 5 illustrates a process in which there is no guaranteed exploration, but a range of criteria may be used for cell selection. The input to the process includes:

Topology Graph

C: candidate set of cells for which actions have been selected by their managing Agents and which are awaiting execution of those actions S: execution set of selected cells for which execution of the selected actions is to be initiated by the controller node Referring to FIG. 5, the controller node first initializes S as an empty set and populates C will all cells (or all cells for which a managing Agent has requested scheduling of execution of a selected action, if such communication is configured between the Agents and the controller node). The controller node then checks that at least one cell is present in C. If so, the controller node selects a cell c from the set C and adds the selected cell c to the set S. The controller then removes from the set C all cells identified in the topology graph as fulfilling the relevant interference criterion with respect to the selected cell c. The controller node repeats the check and selection steps until the set C is empty, at which time the controller node initiates execution of actions for all cells in the set S. As discussed above, the controller node may select a cell c from the set C randomly, according to a cyclic selection algorithm, according to assigned weights of the cells, etc.

Cell Selection with Guaranteed Exploration (Steps 120, 220c, 221-226)

FIG. 6 illustrates a process in which a certain level of exploration is guaranteed. The input to the process includes:

Topology Graph

C: candidate set of cells for which actions have been selected by their managing Agents and which are awaiting execution of those actions C': set of cells for which actions have been selected by their managing Agents and which are awaiting execution of those actions, and for which the actions are part of an exploration phase, i.e. the action represents an exploration of the state action space for the cell S: execution set of selected cells for which execution of the selected actions is to be initiated by the controller node δ: the maximum portion of managed cells that are guaranteed to explore their state-action space at each scheduling interval Referring to FIG. 6, in a first phase the controller node first initializes C, C' and S as empty sets and populates C will all cells (or all cells for which a managing Agent has requested scheduling of execution of a selected action, if such communication is configured between the Agents and the controller node). The Agents may also provide their state-action or Q value. The controller node computes a weight for each cell which may be based on the (state, action) value (i.e., Q-value) of the local agent and the selected action. The manner in which the weights are determined may be selected in accordance with the priorities for management of the plurality of cells. For example, if the aim is to maximize the sum of Q-values for all agents, the Q-value of each agent may be set as their weight. If fairness of action scheduling opportunity is also to be considered, then a virtual queue may be assigned to each cell or agent, with the Q-value at each iteration of the process (i.e. at each scheduling instance) added to the virtual queue for the agent. The length of the virtual queue illustrates the time since the agent was last able to execute a selected action, and the sum of all Q values in the virtual queue weights this representation with the magnitude of the Q values. The sum of the values in the virtual queue may therefore be assigned as the weight for the cell or agent. The virtual queue is flushed when an action for the cell is executed (or in some examples when the cell is added to the set S).

Referring still to FIG. 6, in a second phase, the controller node populates C' with all cells in C for which the selected action is an exploration (for example for which the managing Agent has set an exploration flag). Each agent may have its own particular exploration strategy, and may select when to set an exploration flag or otherwise indicate to the controller node that the selected action represents an exploration of its state action space. The controller node then continues, for as long as there are cells in the set C' and the portion of managed cells which have been added to S from C' is below δ, to randomly select a cell in C', add the randomly selected cell to S, and remove from C' and from C the selected cell and all cells in the topology graph which are indicated as fulfilling an interference criterion with respect to the selected cell. Once the set C' is empty or the threshold δ has been reached, the controller node moves to a third phase.

In the third phase, the controller node checks that at least one cell is present in C. If so, the controller node selects a cell c from the set C and adds the selected cell c to the set S. In the illustrated process the controller performs an E greedy scheduling, selecting the cell c with the highest weight from among the cells in the set C. The controller then removes from the set C the selected cell and all cells identified in the topology graph as fulfilling the relevant interference criterion with respect to the selected cell c. The controller node repeats the check and selection steps until the set C is empty, at which time the controller node initiates execution of actions for all cells in the set S.

It will be appreciated that an operator may control the degree of guaranteed exploration by setting the value of the threshold δ, and may balance fairness with exploitation through the use of weights for cells. For example, if there is to be no guaranteed exploration, then δ may be set to 0, and the controller node may select cells based only on a weight that comprises their Q value, so focusing on optimizing performance through exploitation of existing knowledge in the agents of the state action space of their cells. If fairness towards individual local agents is also to be considered, then virtual queue length, and/or the sum of values in the virtual queue may be set as weight. FIG. 7 illustrates an example of such an implementation, in which agents in cell B and D are initiated to execute their selected actions, as their queue length is larger than the other cells, meaning they haven't been scheduled for some time.

The controller node of the present disclosure ensures that agents of cells that are operable to impact each other do not execute actions at the same time. It is possible that, particularly in dense network topologies with many operationally coupled cells, this may increase the time taken for individual agents to converge to optimum values for configurable parameters. This implies a certain sacrifice of convergence time in order to ensure training stability and safety during convergence, by reducing conflict and interference from neighboring agents. It is possible to manage this tradeoff between convergence time and stability through the interference condition that is used to identify cells that should not execute selected actions at the same time. By tightening the condition of interference, fewer cells will be identified for removal from the candidate set at each method iteration, meaning more actions can be executed at each scheduling interval and convergence time for individual agents will consequently reduce.

There now follows a discussion of some example use cases for the methods of the present disclosure, as well as description of implementation of the methods of the present disclosure for such example use cases. It will be appreciated that the use cases presented herein are not exhaustive, but are representative of the type of problem within a communication network which may be addressed using the methods presented herein.

Use Case 1: Remote Electronic Tilt Optimization Using Reinforcement Learning

As discussed above, antenna tilt optimization is a problem to which RL has been successfully applied. In order to be able to efficiently provide a high level of Quality of Service (QoS) to users, networks must adjust their configuration in an automatic and timely manner. Antenna vertical tilt angle, referred to as downtilt angle, is one of the most important variables to control for QoS management. The problem is to adjust the antenna tilt for each individual cell in light of a plurality of cell and user locations as well as the current antenna tilts of neighbouring cells. The objective is to maximize some trade-off between capacity (for example total cell throughput) and coverage (for example $5^{th}$ percentile user throughput).

For the purposes of this use case, a controller node may be implemented in a Radio Access Node, which may for example comprise a Centralised Unit serving one or more Distributed Units, each Distributed Unit comprising one or more antennas. In another example, a controller node may be implemented in a core network node. The actions selected by agents managing individual cells comprise, for the purposes of this use case, adjustments to the downtilt angle of individual antennas for the cells.

According to one example of the present disclosure, there is provided a computer implemented method for coordinating management of antenna tilt in a plurality of cells in a cellular communication network, wherein each of the plurality of cells is managed by a respective Agent. The method, performed by a controller node, comprises:

assembling a candidate set of cells, wherein each cell in the candidate set is awaiting execution of an antenna downtilt adjustment selected for the cell by its managing Agent;

selecting a cell from the candidate set;

adding the selected cell to an execution set of cells;

removing, from the candidate set of cells, the selected cell and all cells identified in a topology graph of the plurality of cells as fulfilling an interference condition with respect to the selected cell; and if a scheduling condition is fulfilled, initiating, for all cells in the execution set of cells, execution of the antenna downtilt adjustments selected for the cells by their managing agents.

Use Case 2: P0 Nominal PUSCH

P0 Nominal PUSCH is another problem that has been studied in the context of RL. While increasing SINR, higher transmit power not only increases the received power for the serving cell but also creates higher interference towards users in other cells.

For the purposes of this use case, a controller node may be implemented in a Radio Access Node, which may for example comprise a Centralised Unit serving one or more Distributed Units, each Distributed Unit comprising one or more antennas. In another example, a controller node may be implemented in a core network node. The actions selected by agents managing individual cells comprise, for the purposes of this use case, adjustments to the P0 Nominal PUSCH for the individual cells.

According to one example of the present disclosure, there is provided a computer implemented method for coordinating management of Uplink power settings in a plurality of cells in a cellular communication network, wherein each of the plurality of cells is managed by a respective Agent. The method, performed by a controller node, comprises:

assembling a candidate set of cells, wherein each cell in the candidate set is awaiting execution of an Uplink power setting adjustment selected for the cell by its managing Agent;

selecting a cell from the candidate set;

adding the selected cell to an execution set of cells;

removing, from the candidate set of cells, the selected cell and all cells identified in a topology graph of the plurality of cells as fulfilling an interference condition with respect to the selected cell; and if a scheduling condition is fulfilled, initiating, for all cells in the execution set of cells, execution of the Uplink power setting adjustments selected for the cells by their managing agents.

Other uses cases that could be envisaged for methods according to the present disclosure include Downlink Power Control and Maximum Transmission Power, which could be optimized with respect to network level performance in a similar manner to that described above for antenna tilt and P0 Nominal PUSCH.

Examples of the present disclosure thus provide coordination of management of individual cells, so as to avoid conflicts between neighbors that can contaminate reward observation in training and implementation of management policies. Examples of the methods disclosed herein are operable to maximize a network-wide objective, for example through appropriate interference condition and weighting selection. The balance between exploration and exploitation performed by individual local agents is maintained, with, in some examples, a certain level of exploration within the plurality of managed cells being guaranteed. As opposed to complicating individual management policies by trying to implement coordination at individual agent level, aspects of the present disclosure do not interfere with selection by individual agents of a particular action, and agents may execute any action selection process that is based on an observation of the managed environment. Methods according to the present invention coordinate execution of selected actions in order to ensure that both training and execution of individual management policies may be more stable, without the noise that may result from changes in one cell impacting the observed environment, performance and/or reward signal in another cell. Examples of the present disclosure may also eliminate the possibility of multiple cells independently seeking to adjust their parameters to address the same issue in a certain area, which independent action may itself cause an entirely new problem. Examples of the present discourse may come close to eliminating the impact of the actions resulting from decisions made by other agents, so greatly reducing the uncertainty for each local agent when predicting the reward for every action. The possibility for each individual action to perform both exploration and exploitation is maintained.

It will be appreciated that methods according to the present discourse represent an implementation friendly solution to the challenges set out above. Local agents typically have a smaller state/action space compared to a centralized agent that tries to govern large-scale multiple cell parameters, and local agents are consequently easier and faster to train. In addition, a greedy scheduling process such as that described above for selecting the highest weight cell is not overly taxing to implement.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims or numbered embodiments. The word "comprising" does not exclude the presence of elements or steps other than those listed in a claim or embodiment, "a" or "an" does not exclude a plurality, and a single processor or other unit may fulfil the functions of several units recited in the claims or numbered embodiments. Any reference signs in the claims or numbered embodiments shall not be construed so as to limit their scope.

The invention claimed is:

1. A computer implemented method for coordinating management of a plurality of cells in a cellular communication network, wherein each of the plurality of cells is managed by a respective Agent, the method, performed by a controller node, comprising:

assembling a candidate set of cells, wherein each cell in the candidate set is awaiting execution of an action selected for the cell by its managing Agent;

selecting a cell from the candidate set;

adding the selected cell to an execution set of cells;

removing, from the candidate set of cells, the selected cell and all cells identified in a topology graph of the plurality of cells as fulfilling an interference condition with respect to the selected cell; and if a scheduling condition is fulfilled, initiating, for all cells in the execution set of cells, execution of the actions selected for the cells by their managing agents.

2. The method as claimed in claim 1, wherein a cell fulfills an interference with respect to the selected cell if:

at least one of performance or operation of the cell can be impacted by an operational configuration of the selected cell.

3. The method as claimed in claim 1, wherein a cell fulfills an interference with respect to the selected cell if:

at least one of training or execution of a management policy for the cell can be impacted by an operational configuration of the selected cell.

4. The method as claimed in claim 1, wherein the method is for coordinating management of the plurality of cells in the cellular communication network such that performance of the plurality of cells is optimized with respect to at least one network level performance parameter.

5. The method as claimed in claim 1, wherein the scheduling condition comprises:

all cells having been removed from the candidate set.

6. The method as claimed in claim 1, wherein an Agent comprises at least one of a physical or virtual entity that is operable to implement a management policy for the selection of actions to be executed in a cell on the basis of an observation of the cell.

7. The method as claimed in claim 1, wherein an action selected for a cell by its managing Agent comprises at least one of:

a configuration for a communication network node serving the cell;

a configuration for a communication network operation carried out by a communication network node serving the cell;

a configuration for an operation performed by a wireless device in relation to a communication network node serving the cell.

8. The method as claimed in claim 1, wherein an action selected for a cell by its managing Agent comprises an action whose execution is operable to impact at least one of performance or operation of another cell in the plurality of cells.

9. The method as claimed in claim 1, further comprising:
if a scheduling condition is not fulfilled, repeating the steps of:
selecting a cell from the candidate set;
adding the selected cell to the execution set of cells;
removing, from the candidate set of cells, the selected cell and all cells identified in a topology graph of the plurality of cells as fulfilling an interference condition with respect to the selected cell.

10. The method as claimed in claim 1, further comprising:
generating the topology graph of the plurality of cells, wherein the topology graph represents neighbor relations between cells; and
for each cell in the topology graph, identifying all other cells in the topology graph that fulfill the interference condition with respect to the cell.

11. The method as claimed in claim 10, further comprising:
setting the interference condition based on a measure of success used by Agents for evaluating selected actions.

12. The method as claimed in claim 1, wherein the topology graph comprises only cells operating on the same carrier frequency.

13. The method as claimed in claim 1, wherein selecting a cell from the candidate set comprises randomly selecting a cell from the candidate set.

14. The method as claimed in claim 1, wherein selecting a cell from the candidate set comprises using a cyclic selection process to select a cell from the candidate set.

15. The method as claimed in claim 1, further comprising:
assigning a weight to each cell in the candidate set, and
wherein selecting a cell from the candidate set comprises
selecting a cell based on the assigned weights of cells in the candidate set.

16. The method as claimed in claim 15, wherein the Agents comprise Reinforcement Learning, RL, Agents, and wherein assigning a weight to each cell in the candidate set comprises, for a cell:
obtaining a current state-action value from the RL Agent managing the cell; and
setting as the weight of the cell at least one of:
the obtained state-action value;
the sum of all obtained state-action values in a virtual queue assigned to the cell, wherein the virtual queue contains state-action values for each time step of the RL Agent since an action was last executed in the cell.

17. The method as claimed in claim 16, further comprising, if the weight of each cell comprises the sum of all obtained state-action values in a virtual queue assigned to the cell, and following initiation of actions selected for cells in the execution set of cells by their managing agents:
emptying the virtual queues of the cells for which actions have been initiated.

18. The method as claimed in claim 1, wherein selecting a cell from the candidate set comprises:
assembling an exploration set of cells, wherein each cell in the exploration set is a member of the candidate set and wherein the action selected for each cell in the exploration set comprises an exploration of the state-action space for the cell; and
while an exploration condition is satisfied,
randomly selecting a cell from the exploration set;
adding the selected cell to the execution set of cells; and
removing, from the candidate set and from the exploration set, the selected cell and all cells identified in the topology graph of the plurality of cells as fulfilling an interference condition with respect to the selected cell.

19. The method as claimed in claim 18, wherein selecting a cell from the candidate set further comprises:
when an exploration condition is not satisfied,
selecting a cell from the candidate set according to at least one of:
random selection;
a cyclic selection process;
a weight assigned to each cell in the candidate set.

20. The method as claimed in claim 18, wherein the exploration condition comprises:
the exploration set comprising at least one cell; and
the percentage of the plurality of cells that have been added to the execution set is below a threshold value.

21. A controller node for coordinating management of a plurality of cells in a cellular communication network, wherein each of the plurality of cells is managed by a respective Agent, the controller node comprising processing circuitry configured to cause the controller node to:
assemble a candidate set of cells, wherein each cell in the candidate set is awaiting execution of an action selected for the cell by its managing Agent;
select a cell from the candidate set;
add the selected cell to an execution set of cells;
remove, from the candidate set of cells, the selected cell and all cells identified in a topology graph of the plurality of cells as fulfilling an interference condition with respect to the selected cell; and
if a scheduling condition is fulfilled, initiate, for all cells in the execution set of cells, execution of the actions selected for the cells by their managing agents.

* * * * *